(12) United States Patent
Awai

(10) Patent No.: US 11,983,092 B2
(45) Date of Patent: May 14, 2024

(54) INFORMATION PROCESSING DEVICE AND INFORMATION PROCESSING METHOD

(71) Applicant: SONY GROUP CORPORATION, Tokyo (JP)

(72) Inventor: Shoichi Awai, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 127 days.

(21) Appl. No.: 17/624,022

(22) PCT Filed: Jun. 1, 2020

(86) PCT No.: PCT/JP2020/021658
§ 371 (c)(1),
(2) Date: Dec. 30, 2021

(87) PCT Pub. No.: WO2021/010039
PCT Pub. Date: Jan. 21, 2021

(65) Prior Publication Data
US 2022/0358026 A1    Nov. 10, 2022

(30) Foreign Application Priority Data
Jul. 12, 2019   (JP) ................................ 2019-130626

(51) Int. Cl.
*G06F 11/00* (2006.01)
*G06F 9/48* (2006.01)
(Continued)

(52) U.S. Cl.
CPC .......... *G06F 11/364* (2013.01); *G06F 9/4881* (2013.01); *G06F 9/52* (2013.01)

(58) Field of Classification Search
CPC ......... G06F 11/364; G06F 9/4881; G06F 9/52
(Continued)

(56) References Cited

U.S. PATENT DOCUMENTS 8,230,258 B2 * 7/2012 Yamagami .......... G06F 11/1441
714/13
10,514,949 B1 * 12/2019 Korda .................... G06F 9/5072
(Continued)

FOREIGN PATENT DOCUMENTS

| CN | 102439561 A | 5/2012 |
| JP | 03-054638 A | 3/1991 |

(Continued)

OTHER PUBLICATIONS

International Search Report and Written Opinion of PCT Application No. PCT/JP2020/021658, dated Sep. 1, 2020, 09 pages of ISRWO.

*Primary Examiner* — Sarai E Butler
(74) *Attorney, Agent, or Firm* — CHIP LAW GROUP

(57) ABSTRACT

An information processing device and information processing method with improved error tolerance are implemented. There is included a data processing unit that executes lockstep processing in which a plurality of processing systems executes the same task and error verification is performed by comparing execution results. In a case where an error is detected in the lockstep processing, the data processing unit increases supply voltage to a CPU circuit system that executes the task, processing of lowering a supply clock, or the like, as control for improving noise tolerance of the CPU circuit system, and moreover, performs re-execution processing of the task by using more processing systems than the processing systems before the error detection.

12 Claims, 9 Drawing Sheets

| (A) TASK (Task) IDENTIFIER | (B) LOCKSTEP PROCESSING EXECUTION PRIORITY (Priority) (100=High...0=Low) | (C) LOCKSTEP PROCESSING EXECUTION PERIOD (PERIOD: Period(Hz)) | (D) TASK TYPE |
|---|---|---|---|
| 1 | 100 | 100 if speed > 40Km/h<br>50 if speed <= 40km/h | VEHICLE CONTROL TASK |
| 2 | 80 | 80 if speed > 40Km/h<br>40 if speed <= 40km/h | SURROUNDING ENVIRONMENT RECOGNITION TASK |
| 3 | 90 | 70 if speed > 40Km/h<br>40 if speed <= 40km/h | ACTION PLAN DETERMINATION TASK |
| 4 | 1 | 10 TO 40 | AUDIO/VIDEO REPRODUCTION TASK |

(51) Int. Cl.
  *G06F 9/52* (2006.01)
  *G06F 11/36* (2006.01)
(58) Field of Classification Search
  USPC .................................................. 714/1–57
  See application file for complete search history.

(56) References Cited

U.S. PATENT DOCUMENTS

| | | | | |
|---|---|---|---|---|
| 2003/0227305 A1* | 12/2003 | Mikhalev | ................... | G06F 1/10 327/141 |
| 2004/0221208 A1* | 11/2004 | Floyd | ................... | G06F 11/1604 714/50 |
| 2007/0050682 A1* | 3/2007 | Takuma | .............. | G06F 11/3652 714/45 |
| 2007/0183243 A1* | 8/2007 | Tanaka | ................... | G11C 11/406 365/222 |
| 2008/0263073 A1* | 10/2008 | Ohba | ................... | G06F 11/3419 707/E17.046 |
| 2010/0131792 A1* | 5/2010 | Herrod | ................ | G06F 11/0793 714/2 |
| 2010/0281239 A1 | 11/2010 | Sudhakar et al. | | |
| 2015/0212906 A1* | 7/2015 | Gschwind | ........... | G06F 11/1474 714/15 |
| 2015/0309897 A1* | 10/2015 | Shan | ................... | G06F 11/3024 714/10 |

FOREIGN PATENT DOCUMENTS

| | | |
|---|---|---|
| JP | 08-022396 A | 1/1996 |
| JP | 2005-053373 A | 3/2005 |
| JP | 2011-044078 A | 3/2011 |
| JP | 2012-525644 A | 10/2012 |
| KR | 10-2012-0025492 A | 3/2012 |

* cited by examiner

FIG. 4

| (A) TASK (Task) IDENTIFIER | (B) LOCKSTEP PROCESSING EXECUTION PRIORITY (Priority) (100=High...0=Low) | (C) LOCKSTEP PROCESSING EXECUTION PERIOD (PERIOD: Period(Hz)) | (D) TASK TYPE |
|---|---|---|---|
| 1 | 100 | 100 if speed > 40Km/h<br>50 if speed <= 40km/h | VEHICLE CONTROL TASK |
| 2 | 80 | 80 if speed > 40Km/h<br>40 if speed <= 40km/h | SURROUNDING ENVIRONMENT RECOGNITION TASK |
| 3 | 90 | 70 if speed > 40Km/h<br>40 if speed <= 40km/h | ACTION PLAN DETERMINATION TASK |
| 4 | 1 | 10 TO 40 | AUDIO/VIDEO REPRODUCTION TASK |

FIG. 8

| CPU | EXECUTION TASKS AND LOCKSTEP PROCESSING EXECUTION PERIOD (Period(Hz)) OF RESPECTIVE TASKS | | |
|---|---|---|---|
| | t1 | t2 | t3 |
| 0 | Task1-2: 100(RS) | Task1-5: 100(RS) | Task3-2: 100(RS) |
| 1 | Task1-2: 100(RS) | Task1-5: 100(RS) | Task3-2: 100(RS) |
| 2 | Task2-1 | Task1-5: 100(RS) | Task4-1 |
| 3 | (idle) | Task1-5: 100(RS) | Task5-1 |
| 4 | (idle) | Task1-5: 100(RS) | (idle) |

| SYSTEM SETTING | | | |
|---|---|---|---|
| VEHICLE SPEED (km/h) | 100 | 20 | 100 |
| CPU CLOCK (MHz) | 1000 | 500 | 1000 |
| CPU CIRCUIT SYSTEM VOLTAGE (V) | 0.8 | 1.6 | 0.8 | great# INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/021658 filed on Jun. 1, 2020, which claims priority benefit of Japanese Patent Application No. JP 2019-130626 filed in the Japan Patent Office on Jul. 12, 2019. Each of the above-referenced applications is hereby incorporated herein by reference in its entirety.

TECHNICAL FIELD

The present disclosure relates to an information processing device, an information processing method, and a program. More specifically, the present disclosure relates to an information processing device, information processing method, and program capable of improving tolerance to an execution processing error of a program (software).

BACKGROUND ART

As a configuration for improving tolerance to an execution processing error of a program (software), there is a hardware-type dual-core lockstep method having two processing circuits and one comparison circuit.

The hardware-type dual-core lockstep method is a method in which two CPU cores are caused to execute the same calculation in parallel to decide whether or not processing results are the same in the comparison circuit, and in a case where it is decided that the processing results match each other, processing based on the calculation results is executed.

For example, Patent Document 1 (Japanese Patent Application Laid-Open No. 2011-044078) discloses a configuration utilizing this hardware-type dual-core lockstep method.

However, the hardware-type dual-core lockstep method has the following problems.

(a) Two processing circuits and one comparison circuit are required for one piece of processing (task), and a circuit scale is required twice or more as compared to a configuration having one processing circuit, resulting in an increase in size of a hardware configuration and an increase in cost.

(b) Because results are compared every time for all CPU commands, it is difficult to improve an operation clock.

(c) Due to having a hardware configuration, it is difficult to dynamically change a mode of comparison processing, for example, change in necessity of comparison processing according to the task, or the like.

The hardware-type dual-core lockstep method has the above-described problems.

Note that, as a method for error prevention measures that is different from the hardware-type dual-core lockstep method, there is also a lockstep method in which a step of performing error decision or the like is previously incorporated in a program (software).

In this method, for example, the same calculation is executed in a plurality of threads and calculation results of the respective threads are compared, and this method also has a problem that processing capability of an entire system is required twice or more for processing required as a result. Also in this method, processing of comparing output results of the respective threads is executed at any time, and a constant ratio of load is always generated.

CITATION LIST

Patent Document

Patent Document 1: Japanese Patent Application Laid-Open No. 2011-044078

SUMMARY OF THE INVENTION

Problems to be Solved by the Invention

The present disclosure has been made in view of the above-described problems, for example, and an object of the present disclosure is to provide an information processing device, an information processing method, and a program that achieve sufficient error tolerance without causing an increase in size of a processing circuit and an increase in cost.

Solutions to Problems

A first aspect of the present disclosure is
an information processing device having a data processing unit that executes lockstep processing in which a plurality of processing systems executes the same task and error verification is performed by comparing execution results,
in which, in a case where an error is detected in the lockstep processing, the data processing unit executes control for improving noise tolerance of a CPU circuit system that executes the task, and then re-executes the task.

Moreover, a second aspect of the present disclosure is
an information processing method executed in an information processing device,
in which the information processing device has a data processing unit that executes lockstep processing in which a plurality of processing systems executes the same task and error verification is performed by comparing execution results, and
in a case where an error is detected in the lockstep processing, the data processing unit executes control for improving noise tolerance of a CPU circuit system that executes the task, and then re-executes the task.

Moreover, a third aspect of the present disclosure is
a program that causes execution of information processing in an information processing device,
in which the information processing device has a data processing unit that executes lockstep processing in which a plurality of processing systems executes the same task and error verification is performed by comparing execution results, and
in a case where an error is detected in the lockstep processing, the program causes the data processing unit to execute control for improving noise tolerance of a CPU circuit system that executes the task, and then re-execute the task.

Note that a program according to the present disclosure is, for example, a program that can be provided by a storage medium or communication medium provided in a computer-readable format to an information processing device or computer system capable of executing various program codes. By providing such a program in the computer-readable format, processing according to the program is achieved on the information processing device or the computer system.

Still other objects, features, and advantages of the present disclosure will be apparent from more detailed description based on an embodiment of the present disclosure described later and the accompanying drawings. Note that, in the present specification, a system is a logical set configuration of a plurality of devices, and is not limited to a system in which devices of respective configurations are in the same housing.

According to a configuration of an embodiment of the present disclosure, an information processing device and information processing method with improved error tolerance are implemented.

Specifically, for example, a configuration of an embodiment of the present disclosure has a data processing unit that executes lockstep processing in which a plurality of processing systems executes the same task and error verification is performed by comparing execution results. In a case where an error is detected in the lockstep processing, the data processing unit increases supply voltage to a CPU circuit system that executes the task, processing of lowering a supply clock, or the like, as control for improving noise tolerance of the CPU circuit system, and moreover, performs re-execution processing of the task by using more processing systems than the processing systems before the error detection.

With this configuration, an information processing device and information processing method with improved error tolerance are implemented.

Note that the effects described herein are only examples and are not limited thereto, and additional effects may also be present.

BRIEF DESCRIPTION OF DRAWINGS

FIG. 4 is a diagram describing a task control example executed by the information processing device according to the present disclosure.

FIG. 8 is a diagram describing a task control example executed by the information processing device according to the present disclosure.

MODE FOR CARRYING OUT THE INVENTION

Figure 1:
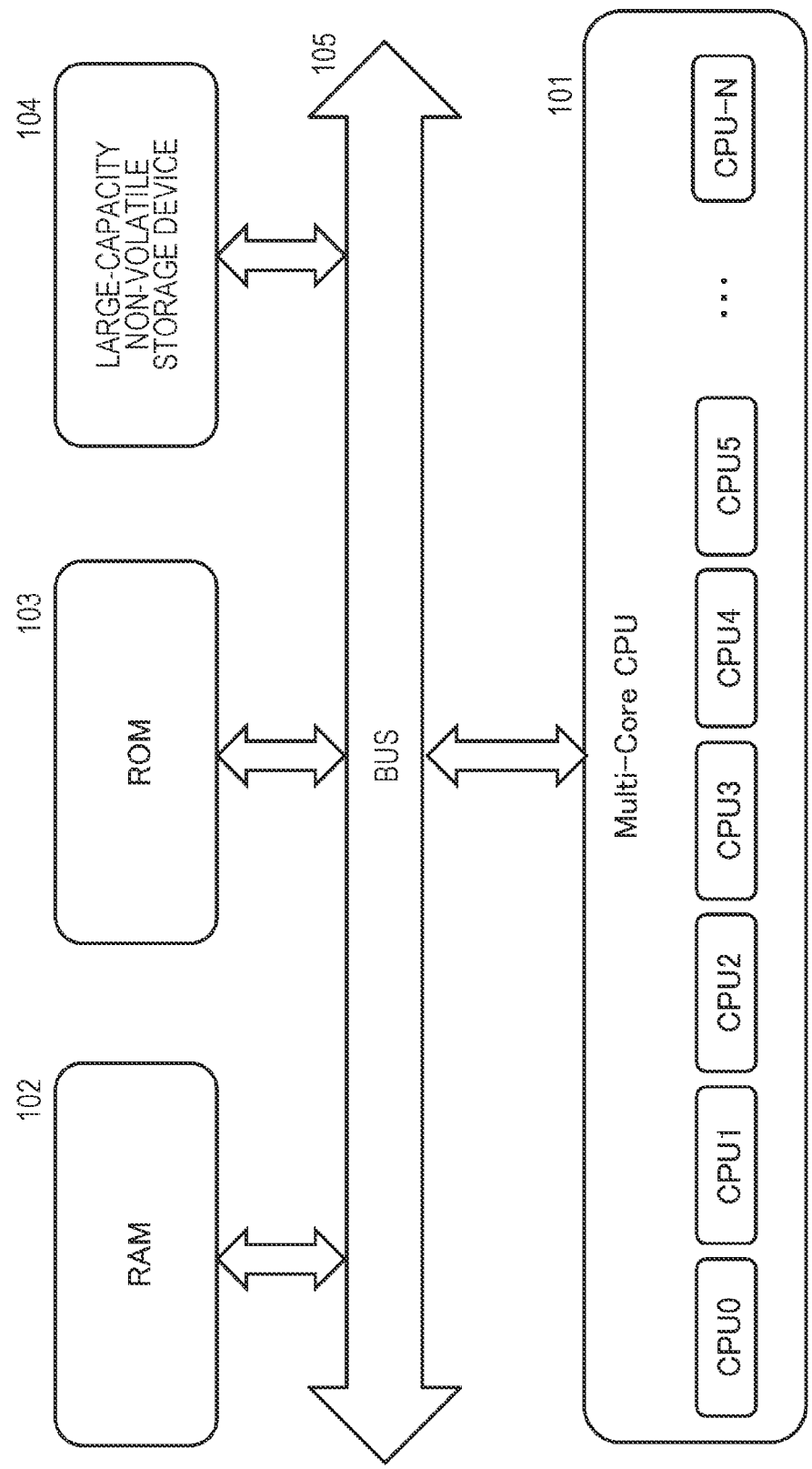
FIG. 1 is a diagram describing a configuration example of an information processing device according to the present disclosure.

Hereinafter, an information processing device, information processing method, and program according to the present disclosure will be described in detail with reference to the drawings. Note that the description will be made according to the following items.

1. Overview of processing executed by information processing device according to present disclosure
2. About configuration example of information processing device according to present disclosure
3. Specific embodiment of processing executed by information processing device according to present disclosure
4. Sequence of processing executed by information processing device according to present disclosure
5. Specific processing example of task control executed by information processing device according to present disclosure
6. Conclusion and effects of processing by information processing device according to present disclosure
7. Configuration example of information processing device
8. Conclusion of configuration of present disclosure 1. Overview of Processing Executed by Information Processing Device According to Present Disclosure First, an overview of processing executed by the information processing device according to the present disclosure will be described.

The information processing device according to the present disclosure is an information processing device capable of achieving sufficient error tolerance and executing various tasks without causing an increase in size of a processing circuit and an increase in cost. In particular, the information processing device according to the present disclosure is a device having improved error tolerance to a soft error that is difficult to completely avoid in view of a characteristic of an electronic circuit.

In the information processing device according to the present disclosure, for example, the same task, for example, the same calculation processing is performed by two or more CPU cores or two or more threads, and the results are compared. In a case where the comparison result shows a discrepancy, it is decided that an error has occurred.

Note that processing of duplicately performing calculation processing in two or more processing systems (CPU cores or threads) and comparing results to perform error verification is referred to as "lockstep" or "lockstep processing".

For example, in a case where a processing error, for example a calculation error or the like, of a certain task is detected, the information processing device according to the present disclosure performs re-try processing that causes the same task to be executed again. Before starting the re-try processing, the information processing device executes control for lowering an error occurrence level on a CPU circuit system that is a task execution unit, and then causes the CPU circuit system to perform re-calculation (re-try). For example, such control enables highly reliable calculation.

Specifically, for example, noise tolerance is improved by increasing voltage on a CPU core, which is a calculation processing execution unit, and the CPU circuit system such as an address/data bus, and then re-calculation (re-try processing) processing is started.

Note that an upper limit of an operation clock may be restricted by increasing voltage on a bus or the like.

In this case, processing of lowering the operation clock is also performed along with the processing of increasing the voltage of the bus or the like.

However, when the operation clock is lowered, processing capability per unit time is reduced.

In the information processing device according to the present disclosure, in order to prevent excessive reduction in processing capability, priority (priority (priority)) is previously set for various tasks executed by the information processing device. There is performed processing of setting only a task with a high priority as a target of executing lockstep and excluding a task with a low priority from targets of executing lockstep.

Moreover, the information processing device according to the present disclosure executes lockstep processing on a lockstep execution target task by executing a task by software by using two processing systems (two CPU cores, or two threads) in a normal time. In a case where an error is detected in the lockstep processing in the normal time and task re-processing (re-calculation processing) is executed, the number of processing systems is increased to, for example, three or more, and the same calculation is re-executed (re-try processing) by using three or more processing systems.

By such processing, noise tolerance can be improved. Furthermore, when the system is restored to normal, the number of processing systems is also be dynamically reduced.

Note that, although results of calculation by all the processing systems may not match one another in a case where a task (operation) is executed by utilizing three or more processing systems, in this case, final output is determined by a majority decision theory.

For example, in a case where the same task is executed by three processing systems, and results from the two processing systems match each other, the results are utilized as final output, and the processing moves on to next processing.

In the information processing device according to the present disclosure, in a case where lockstep processing is executed, the same task is executed by utilizing a plurality of processing systems. As a result, a rate of simultaneous use of the plurality of processing systems increases, and processing capability of the system may be insufficient.

In order to solve this problem, as described above, the information processing device according to the present disclosure sets a priority (priority (priority)) to each of various tasks to be executed by the information processing device, and, on only a task with a high priority, executes lockstep, that is to say execution of the same task to which a plurality of processing systems is applied, and result matching decision processing.

The lockstep is not executed on a task at a low priority level. That is to say, execution of the same task to which the plurality of processing systems is applied, and result matching decision processing are not executed.

Furthermore, the information processing device according to the present disclosure also performs processing of dynamically increasing or decreasing the number of processing systems for a task subject to lockstep execution.

For example, in a case where error occurrence is not detected for a certain period of time or longer during execution of the lockstep using three or more processing systems, processing of reducing the number of processing systems utilized for the lockstep is performed. Finally, the processing moves on to a lockstep execution mode in which only two processing systems are utilized.

2. About Configuration Example of Information Processing Device According to Present Disclosure Next, a configuration example of the information processing device according to the present disclosure will be described.

FIG. 1 illustrates one configuration example of an information processing device 100 according to the present disclosure.

As illustrated in FIG. 1, an embodiment configuration of the information processing device 100 according to the present disclosure has a multi-core CPU 101.

The multi-core CPU (Multi-Core CPU) 101 includes two or more cores (CPUs) as hardware. That is to say, the multi-core CPU 101 has a plurality of CPUs, and each of the CPUs can execute individual processing (tasks) in parallel.

Note that the information processing device 100 according to the present disclosure is not necessarily required to have such a multi-core CPU 101 having a plurality of CPUs, and can be applied to a configuration having a single CPU in which different tasks are executed in time series in units of threads.

The configuration illustrated in FIG. 1 is one configuration example of the information processing device according to the present disclosure.

The information processing device 100 illustrated in FIG. 1 has a random access memory (RAM) 102, a read only memory (ROM) 103, and a large-capacity non-volatile storage device 104 in addition to the multi-core CPU 101, and has a configuration in which each of these elements are connected by a bus 105.

The read only memory (ROM) 103 is utilized as a storage area for a program of a task executed by the multi-core CPU 101, a parameter required for task execution, or the like.

The random access memory (RAM) 102 is utilized as a work area utilized for processing executed by the multi-core CPU 101, a parameter storage area, a recording area of other data, or the like.

The large-capacity non-volatile storage device 104 is, for example, a storage device such as a hard disk, a CD, a DVD, or a flash memory, and records a storage area of a program of a task executed by the multi-core CPU 101, processing result data of the task executed by the multi-core CPU 101, and the like.

In the multi-core CPU 101, for example, various kinds of processing is executed according to a program stored in the read only memory (ROM) 103 or large-capacity non-volatile storage device 104.

As illustrated in FIG. 1, the multi-core CPU 101 includes two or more cores (CPUs) as hardware.

Figure 2:
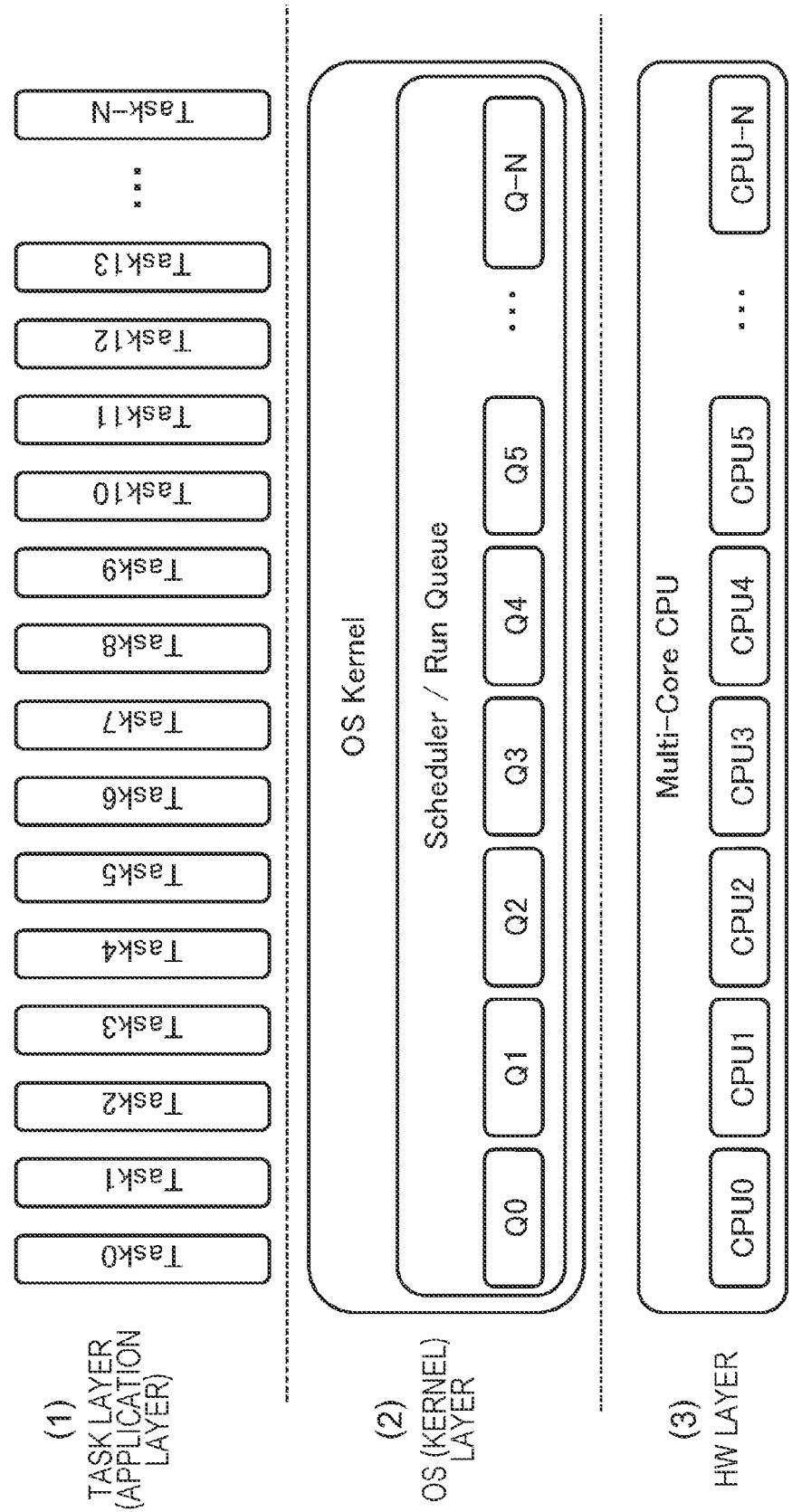
FIG. 2 is a diagram describing a configuration example of a software stack of the information processing device according to the present disclosure.

FIG. 2 illustrates a software configuration (software stack) executed by a core (CPU) as hardware in the multi-core CPU 101.

As illustrated in FIG. 2, the software stack includes each of the following layers.

(1) Task layer (application layer)
(2) OS (kernel) layer
(3) Hardware (HW) layer The task layer (application layer) includes, for example, a plurality of tasks executed corresponding to various kinds of processing according to a program stored in the ROM 103 or in the large-capacity non-volatile storage device 104.

Note that these tasks include a large number of different tasks of various types, such as a real-time task in which a processing completion deadline or processing start time point is defined, or another non-real-time task.

These tasks are executed in each of the CPUs (cores) in the multi-core CPU 101 of the hardware (HW) layer.

The OS (kernel) layer has a function of a task scheduler that assigns a task to each of the CPUs (cores) of the multi-core CPU 101 of the hardware (HW) layer and determines an execution sequence or the like of each of the tasks. The task scheduler executes task management processing such as setting of a queue in which tasks are arranged in an execution order, assignment of a task to each of the CPUs (cores) constituting the multi-core CPU 101, or task movement processing between each of the cores.

Note that processing corresponding to the OS (kernel) layer is actually executed as a kernel thread in a CPU (core) of the multi-core CPU 101 of the hardware (HW) layer.

In the kernel thread, task scheduling processing as management processing is executed, the task scheduling processing including assignment of tasks to each of the CPUs (cores) constituting the multi-core CPU 101, which is processing corresponding to a kernel that is software of a central core of an operating system (OS), task movement processing between each of the cores, and the like.

Moreover, management of a resource or memory necessary for execution of a task in each of the cores and processing of task switching or the like are also included.

3. Specific Embodiment of Processing Executed by Information Processing Device According to Present Disclosure Next, a specific embodiment of processing executed by the information processing device according to the present disclosure will be described.

Figure 3:
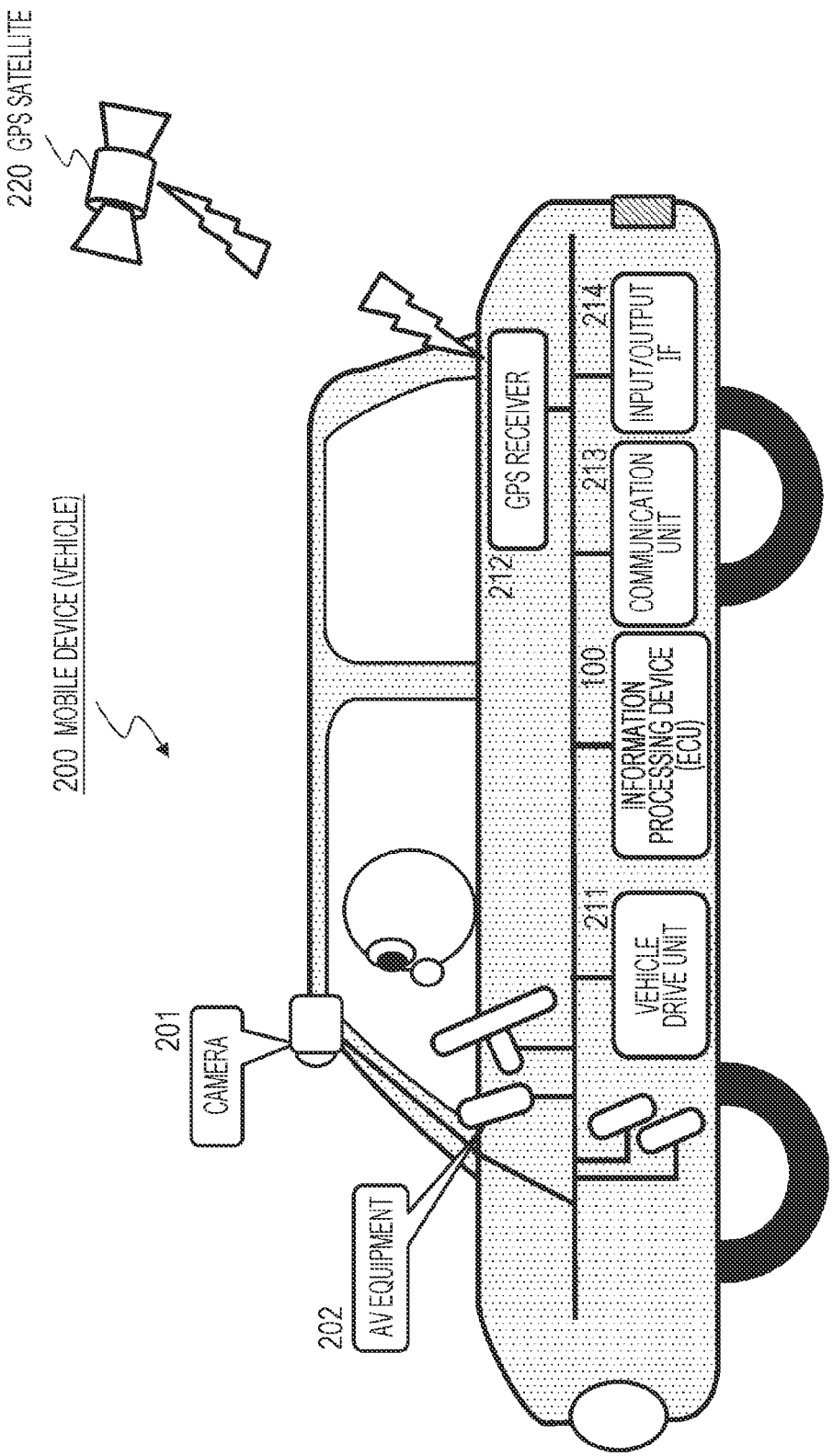
FIG. 3 is a diagram describing an example of a mobile device (vehicle) including the information processing device according to the present disclosure.

Hereinafter, a specific example will be described in which, as illustrated in FIG. 3, the information processing device 100 according to the present disclosure illustrated in FIG. 1 is equipped on a mobile device (vehicle) 200 such as an automobile, and the information processing device 100 executes various kinds of processing (tasks).

The information processing device 100 executes various kinds of processing generated in the mobile device 200, specifically, a plurality of pieces of processing (tasks) as follows.

(1) Vehicle control such as autonomous driving,
(2) Surrounding environment recognition processing based on information input from a camera, sensor, or the like included in the mobile device (vehicle) 200,
(3) Action plan determination processing based on a result of the surrounding environment recognition,
(4) Audio and video reproduction control processing included in the mobile device (vehicle) 200, FIG. 3 is a diagram illustrating a configuration example of an automobile (vehicle) that is one example of the mobile device 200.

As illustrated in FIG. 3, the mobile device 200 has a camera 201, AV equipment 202, a vehicle drive unit 211, an information processing device (ECU) 100, a GPS receiver 212, a communication unit 213, and an input/output IF 214.

Note that these components only indicate some main components of the mobile device 200, and the mobile device 200 has a large number of components other than these components.

Among the components illustrated in FIG. 3, the information processing device (ECU) 100 corresponds to the information processing device 100 described with reference to FIG. 1. That is to say, information processing device (ECU) 100 is an information processing device 100 including a multi-core CPU having a plurality of CPUs (cores), and is capable of executing an individual task in each of the CPUs.

Note that the information processing device (ECU) 100 mounted on the vehicle is connected to each of the components of the mobile device 200 by, for example, a controller area network (CAN) standardized as an in-vehicle network, and performs control by transmitting and receiving CAN messages in accordance with a CAN protocol.

The information processing device (ECU) 100 executes various controls such as, for example, processing of an image captured by the camera 201, output control of the AV equipment 202, control of opening/closing, locking, or the like of a door, control of communication with a GPS satellite 220 by the GPS receiver 212, communication control in the communication unit 213, or the like, in addition to drive control related to drive of the mobile device 200, such as the vehicle drive unit 211 or steering.

These pieces of control are performed by a program (software) stored in the ROM 102 or large-capacity non-volatile storage device 103 inside the information processing device (ECU) 100.

As described above, the information processing device 100 executes various kinds of processing generated in the mobile device 200, specifically, a plurality of pieces of processing (tasks) as follows.

(1) Vehicle control such as autonomous driving,
(2) Surrounding environment recognition processing based on information input from a camera, sensor, or the like included in the mobile device (vehicle) 200,
(3) Action plan determination processing based on a result of the surrounding environment recognition,
(4) Audio and video reproduction control processing included in the mobile device (vehicle) 200, The information processing device 100 executes these various tasks, and the information processing device 100 previously sets the following parameters for each of these various tasks and stores the parameters in a storage unit (any of the RAM 102, the ROM 103, and the large-capacity non-volatile storage device 104).

(1) Lockstep processing execution priority (Priority)
(2) Lockstep processing execution period (period (Period))

As described above, the lockstep processing is processing of duplicately performing the same task such as calculation processing in two or more processing systems (CPU cores or threads) and comparing results to perform error verification.

(1) The lockstep processing execution priority (Priority) is execution priority information of lockstep processing set in association with each task executed by the information processing device 100.

For example, the information processing device 100 executes lockstep processing by placing priority on a task with a high priority. Specifically, processing is performed such that the lockstep processing is always executed for a task with a high priority, and the lockstep processing is omitted for a task with a low priority.

(2) The lockstep processing execution period (period (Period)) is an execution period of lockstep processing set in association with each task executed by the information processing device 100.

The information processing device 100 executes the lockstep processing at a shorter interval for a task having a short execution period of the lockstep processing, and executes the lockstep processing at a longer interval for a task having a long execution period of the lockstep processing.

FIG. 4 illustrates specific setting examples of these parameters.

FIG. 4 illustrates specific examples of the following parameters set corresponding to a plurality of tasks executed by the information processing device 100 mounted on the mobile device 200 illustrated in FIG. 3.

(1) Lockstep processing execution priority (Priority)
(2) Lockstep processing execution period (period (Period))

The table illustrated in FIG. 4 is a correspondence table of each of the following data.

(A) Task identifier
(B) Lockstep processing execution priority (Priority) (100=High, 0=Low)
(C) Lockstep processing execution period (period (Period)) (Hz)
(D) Task type
(B) Lockstep processing execution priority (Priority) is set within a range of priority=0 to 100.

Priority=100 is a highest priority, and priority=0 is a lowest priority.

The priority=0 is set to a task of a low degree of importance, for example, a task of audio/video reproduction that falls within a local noise level even in a case where decoding of a bit stream fails. Meanwhile, the priority=100 is set for a task requiring absolute reliability, for example, a route plan calculation for autonomous driving or for a control system task.

(C) Lockstep processing execution period (period (Period)) is a period (Hz) in which the lockstep processing is executed. The larger the value of the task, the shorter the period at which the lockstep is executed, and the more frequently the lockstep processing is executed. The smaller the value of the task, the longer the period at which the lockstep is executed, and the less frequently the lockstep processing is executed. The range of the lockstep processing execution period (period (Period)) is, for example, 1 to 1000 Hz.

In the example illustrated in the drawing, Task1 is a vehicle control task, Task2 is a surrounding environment recognition task, Task3 is an action plan determination task, and Task 4 is an audio/video reproduction task.

Note that there are many other tasks executed by the information processing device 100. The tasks illustrated in FIG. 4 indicate some representative tasks.

In Task1, that is to say, the vehicle control task,
(B) Lockstep processing execution priority (Priority) =100, which is a setting with a highest priority.

A setting specified for (C) Lockstep processing execution period (Period) varies depending on speed of the mobile device 200.

In a case where the speed of the mobile device 200 is faster than 40 Km/h, the lockstep processing execution period (Period)=100 Hz, and
in a case where the speed of the mobile device 200 is 40 Km/h or less, the lockstep processing execution period (Period)=50 Hz.

The setting is specified as above.

This setting is for shortening a lockstep execution period to execute lockstep processing with high frequency in a case where the vehicle is traveling at a high speed, and lengthening the lockstep execution period to execute lockstep processing with low frequency in a case where the vehicle is traveling at a low speed.

For example, in a case where the vehicle performs autonomous driving, positional accuracy that may be required corresponding to travel speed changes, and therefore, it is necessary to accordingly change a period of calculation processing result comparison. This is because, in a case where positional accuracy required for an autonomous driving vehicle is 1 cm for example, planned travel route calculation performed once per second is sufficient in a case of low-speed traveling of 3.6 Km/h (=1 m/sec), whereas the planned travel route calculation is required to be performed ten times per second in a case where the speed is 36 Km/h, which is ten times faster.

Task2, that is to say, the surrounding environment recognition task is, for example, processing of confirming a surrounding environment on the basis of an image captured by the camera 201 illustrated in FIG. 3. This processing is also an important task in a case where autonomous driving processing is performed.

Settings for Task2, which is the surrounding environment recognition task, are as follows.

(B) Lockstep processing execution priority (Priority)=80, which is a setting with a relatively high priority.

A setting specified for (C) Lockstep processing execution period (Period) varies depending on speed of the mobile device 200.

In a case where the speed of the mobile device 200 is faster than 40 Km/h, the lockstep processing execution period (Period)=80 Hz, and
in a case where the speed of the mobile device 200 is 40 Km/h or less, the lockstep processing execution period (Period)=40 Hz.

The setting is specified as above.

This setting is for shortening a lockstep execution period to execute lockstep processing with high frequency in a case where the vehicle is traveling at a high speed, and lengthening the lockstep execution period to execute lockstep processing with low frequency in a case where the vehicle is traveling at a low speed.

A reason for changing the period according to the speed is similar to a reason in Task1.

Task3, that is to say, an action plan task is, for example, a task such as route planning for autonomous driving, such as planning a route along which the vehicle is caused to travel after confirmation of a surrounding environment or the like. This processing is also an important task in a case where autonomous driving processing is performed.

Settings for Task3, which is the action plan task, are as follows.

(B) Lockstep processing execution priority (Priority)=90, which is a setting with a relatively high priority.

A setting specified for (C) Lockstep processing execution period (Period) varies depending on speed of the mobile device 200.

In a case where the speed of the mobile device 200 is faster than 40 Km/h, the lockstep processing execution period (Period)=70 Hz, and in a case where the speed of the mobile device 200 is 40 Km/h or less, the lockstep processing execution period (Period)=40 Hz.

The setting is specified as above.

This setting is for shortening a lockstep execution period to execute lockstep processing with high frequency in a case where the vehicle is traveling at a high speed, and lengthening the lockstep execution period to execute lockstep processing with low frequency in a case where the vehicle is traveling at a low speed.

A reason for changing the period according to the speed is similar to a reason in Task1.

Task 4, that is to say, the audio/video reproduction task is, for example, a task of reproducing AV data utilizing a speaker or a display. This processing is also a task with a low priority as compared to the autonomous driving control.

Settings for Task 4, which is the audio/video reproduction task, are as follows.
- (B) Lockstep processing execution priority (Priority)=1, which is a setting with a low priority.
- (C) Lockstep processing execution period (Period)=10 Hz to 40 Hz, and a relatively long lockstep execution period is set, that is to say, lockstep processing is executed with low frequency.

Note that a reason why the lockstep processing execution period (Period) has a range of 10 Hz to 40 Hz means that the lockstep processing execution period (Period) varies depending on a type of a signal output by utilizing AV equipment. For example, in a case of AV output control when listening to music, viewing a video, or the like, the lockstep processing is executed at a low speed with a setting of period=10 Hz or the like, which is low. Meanwhile, in a case of performing important processing such as a warning to a driver, the lockstep processing is executed at a slightly high speed with a setting of period=40 Hz or the like, which is high.

As described above, for each of various tasks executed by the information processing device 100 according to the present disclosure, the information processing device 100 previously set the following parameters,
- (1) Lockstep processing execution priority (Priority)
- (2) Lockstep processing execution period (period (Period))

and executes lockstep processing for each of the tasks according to the parameters.

That is to say, an execution mode for the lockstep processing is changed according to a task by using the above-described two task corresponding parameters (priority and period).

The information processing device 100 according to the present disclosure changes an execution mode for lockstep processing according to a task by using these two parameters (Priority, Period), and further performs the following control.
- (a) In a case where the lockstep processing execution period (period (Period)) of a task under execution in the information processing device 100 is long, the CPU has a margin in calculation capability and therefore, lockstep for all calculations are performed, including a task having a low lockstep processing execution priority (Priority).
- (b) As the lockstep processing execution period (period (Period)) of the task under execution in the information processing device 100 becomes shorter, calculation load of the CPU also increases.

Here, in a case where the calculation load increases to such an extent that the processing according to a lockstep processing execution period (period (Period)) defined in the task cannot be performed, lockstep of a task with a low lockstep processing execution priority (Priority) is set not to be executed, and processing of a plurality of systems is not performed on the task having a low lockstep processing execution priority (Priority), and the processing moves on to independent processing by only one core or thread.

Meanwhile, in a case where the CPU obtains a margin in calculation capability, the task having low lockstep processing execution priority (Priority) is also reset to a lockstep execution target task again.

With these pieces of processing, it is possible to perform a lockstep according to required processing or period while providing an upper limit to overall CPU calculation processing.

4. Sequence of Processing Executed by Information Processing Device According to Present Disclosure Next, a sequence of processing executed by the information processing device according to the present disclosure will be described.

Figure 5:
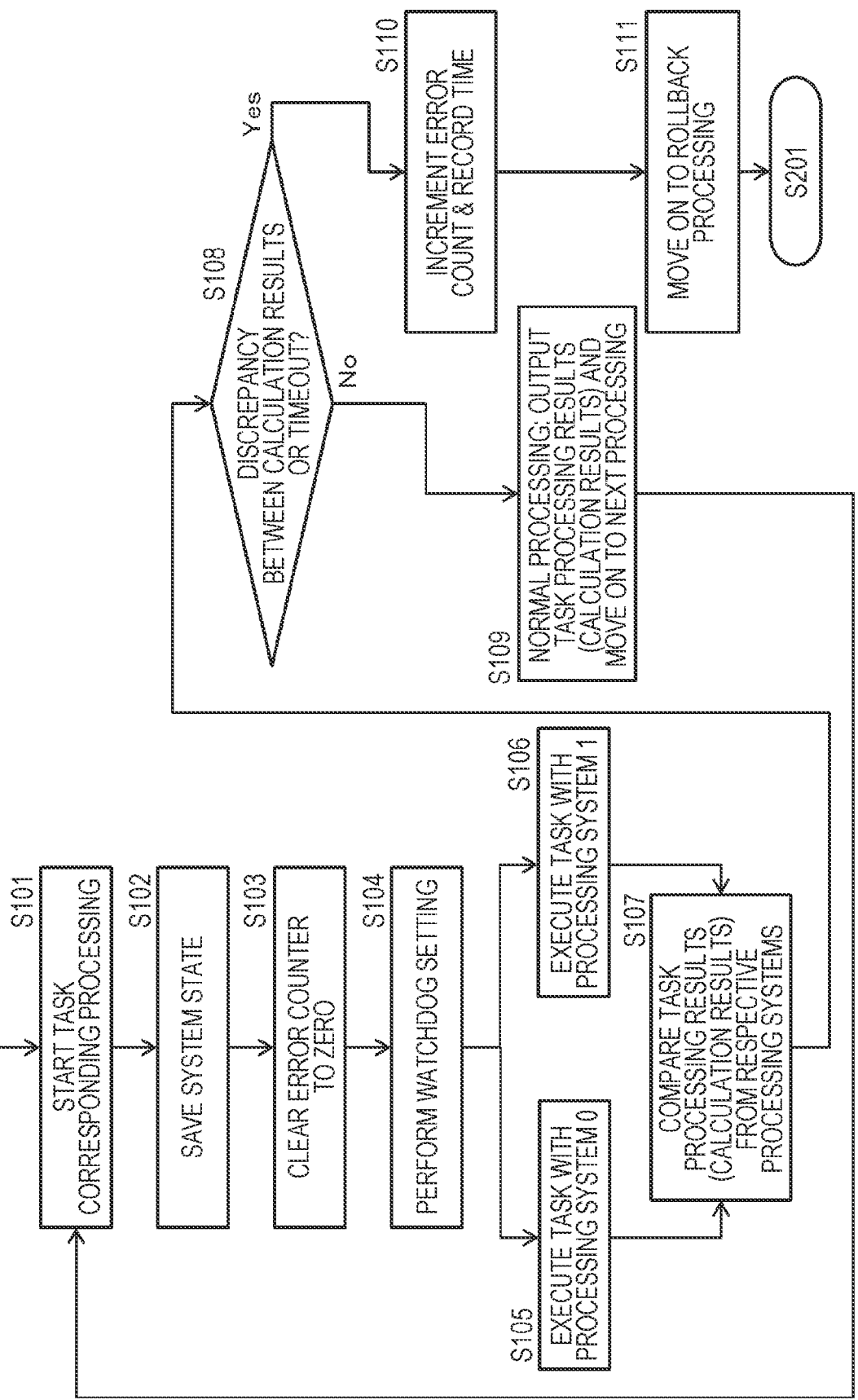
FIG. 5 is a diagram illustrating a flowchart describing a processing sequence executed by the information processing device according to the present disclosure.

Flowcharts illustrated in FIG. 5 and subsequent drawings are flowcharts for describing a sequence of processing executed by the information processing device 100 according to the present disclosure.

Note that the processing according to the flowcharts illustrated in FIG. 5 and subsequent drawings is executed by a data processing unit of the information processing device 100 according to a program stored in the storage unit. Specifically, the data processing unit is a task scheduler of an OS (kernel) layer mainly illustrated in FIG. 2. Hardware that executes processing is mainly a CPU of the HW layer.

First, processing of each step of a flow illustrated in FIG. 5 will be sequentially described.

(Step S101) The data processing unit of the information processing device 100 first starts task corresponding processing in Step S101.

Specifically, a task to be executed is set to a queue of the task scheduler.

As described above with reference to FIG. 2, the OS (kernel) layer executes task scheduling of assigning a task to each of the CPUs (cores) of the multi-core CPU 101 of the hardware (HW) layer and determining an execution sequence or the like of each of the tasks. The task scheduler sets a queue in which tasks are arranged in an execution order.

In Step S101, these pieces of processing are executed.

(Step S102)

Next, in Step S102, the data processing unit saves a system state after the task corresponding processing in Step S101.

The system state is various pieces of current state information such as saving of task processing results (calculation results or the like) of an executed task in the storage unit, moreover, a state of a task under execution, the number of times of error occurrence (=the number of times of occurrence of a discrepancy in a result of comparing calculation results) that is a result of lockstep processing of a task under execution, setting of a CPU clock, voltage setting for the CPU circuit system related to execution of calculation processing of a CPU core, the address/data bus, or the like, or the like.

In Step S102, these system states are saved in the storage unit (RAM or the like).

(Step S103)

Next, in Step S103, the data processing unit clears the number of error counts corresponding to the task set to the queue in Step S101 to zero.

That is to say, because the task set to the queue in Step S101 is processing to execute first lockstep processing from now on, that is to say, lockstep processing in which the same task is executed by utilizing a plurality of processing systems and the processing results (calculation results) are compared, the number of error counts of this task is reset to zero before starting the first lockstep processing.

(Step S104)

Next, in Step S104, the data processing unit performs a watchdog setting.

The watchdog setting means measurement start of a timer that measures whether or not a task is completed within an allowed time from task start to task completion previously defined in association with the task.

After the watchdog setting, the task is started, and in a case where the task is not completed within a task execution allowed time previously defined in association with the task, it is decided that a timeout has occurred.

(Steps S105, S106)

Next, in Steps S105, S106, the data processing unit starts lockstep processing of the task set to the queue in Step S101.

That is to say, the same task is executed by using two processing systems (processing systems 0, 1).

(Step S107)

The processing in next Step S107 is also lockstep processing, and processing results (calculation results) of the same task executed by using the two processing systems (processing systems 0, 1) in Steps S105, S106 are compared.

(Step S108)

Next, in Step S108, the data processing unit decides whether or not a discrepancy (error) between the processing results (calculation results) of the same task in the two processing systems (processing systems 0, 1) has occurred or a timeout has occurred.

In a case where it is decided that a discrepancy (error) in the processing results (calculation results) has occurred or a timeout has occurred, the processing proceeds to Step S110.

Meanwhile, in a case where it is confirmed that the processing results (calculation results) of the same task in the two processing systems (processing systems 0, 1) match each other without causing a timeout, the processing proceeds to Step S109.

(Step S109)

In a case where it is confirmed in Step S108 that the processing results (calculation results) of the same task in the two processing systems (processing systems 0, 1) match each other without causing a timeout, the processing proceeds to Step S109.

In Step S109, the data processing unit decides that normal processing has been performed, outputs the task processing results (calculation results), and moves on to processing of a next task.

(Step S110)

Meanwhile, in a case where it is decided in Step S108 that a discrepancy (error) in the processing results (calculation results) has occurred or a timeout has occurred, the processing proceeds to Step S110.

In Step S110, the data processing unit increments a count of the number of errors recorded corresponding to the task by one, and further records time information. The time information is data for measuring time elapsed from the task start.

(Step S111)

Next, the data processing unit moves on to rollback processing.

The rollback processing is processing for executing again a task in which an error in lockstep processing, that is to say a discrepancy in task execution results in a plurality of processing systems, is confirmed.

A detailed sequence of the rollback processing will be described with reference to the flowchart illustrated in FIG. 6.

Figure 6:
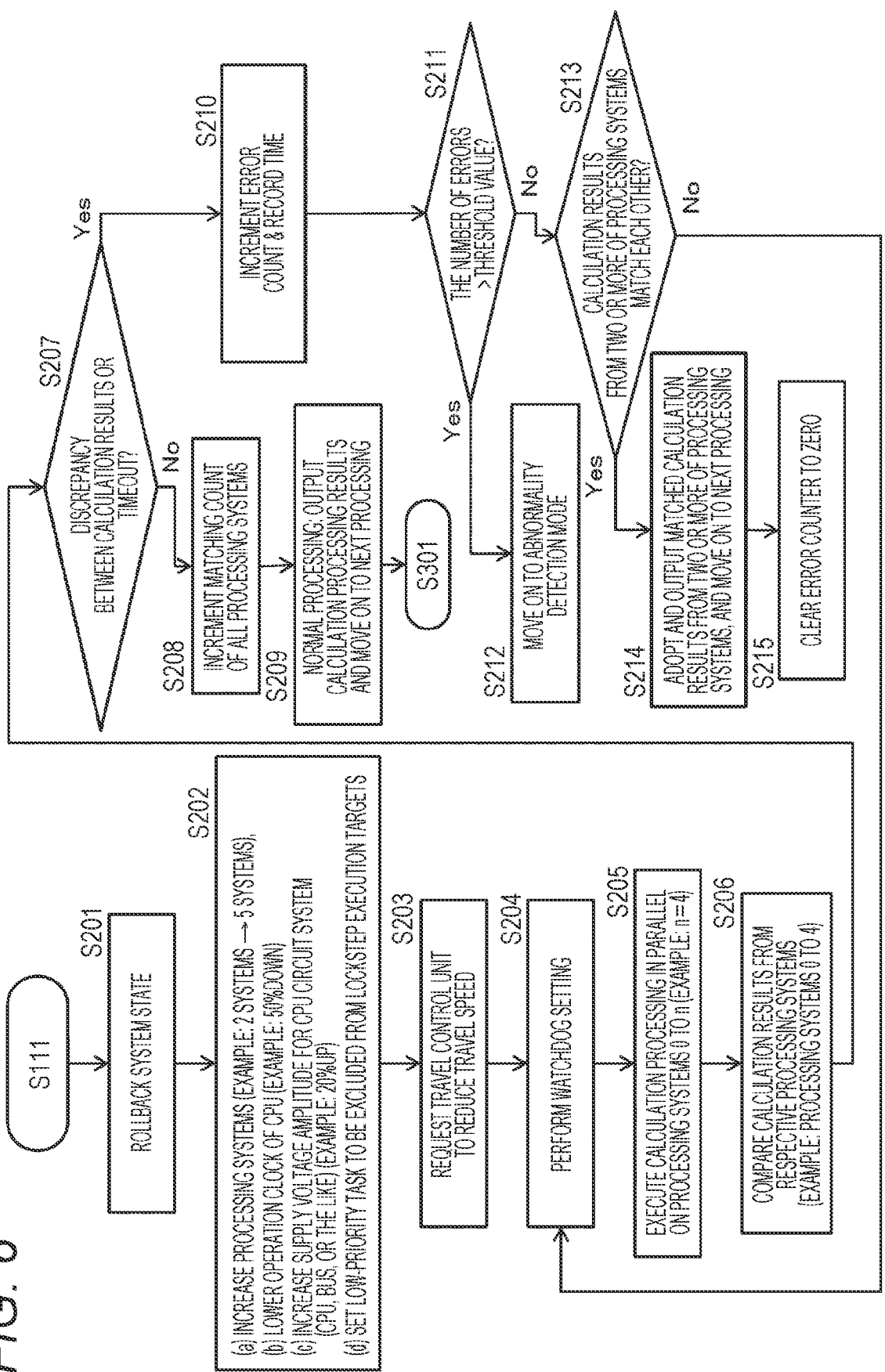
FIG. 6 is a diagram illustrating a flowchart describing the processing sequence executed by the information processing device according to the present disclosure.

The processing of each step of the flow illustrated in FIG. 6 will be sequentially described.

(Step S201)

First, in Step S201, the data processing unit of the information processing device 100 performs rollback processing for the system state.

This is processing of restoring the system state to a state before execution of the task in which an error in lockstep processing, that is to say a discrepancy in task execution results in a plurality of processing systems, is confirmed.

(Step S202)

Next, in Step S202, the data processing unit of the information processing device 100 executes the following processing as pre-processing of re-try processing that executes again the task in which an error has been confirmed.

(a) Increase the number of processing systems (example: 2 systems->5 systems), (b) Lower the operation clock of the CPU (Example: 50% DOWN)

(c) Increase supply voltage amplitude for the CPU circuit system (CPU, bus, or the like) (example: 20% UP)

(d) Set a low-priority task (calculation or the like) to be excluded from lockstep execution targets These pieces of processing (a) to (d) are processing for reducing possibility of error occurrence in a task that mainly performs re-try processing.

(a) By increasing the number of processing systems (for example, from two systems to five systems), it is possible to determine a final output by majority decision, for example.

(b) Lower the operation clock of the CPU (example: 50% DOWN), (c) Increase supply voltage (amplitude) to the CPU circuit system (CPU, bus, or the like) (example: 20% UP), These pieces of processing have an effect of reducing occurrence of an error in the CPU that executes the re-try processing, which is an error based on disturbance noise, for example.

(d) Set a low-priority task to be excluded from lockstep execution targets, and this processing is processing for causing the CPU to preferentially process a task on which re-try processing is performed.

(Step S203)

Next, the data processing unit requests a travel control unit of a mobile device, such as an automobile, equipped with the information processing device to reduce travel speed.

This processing is processing for reducing possibility of erroneous travel control during re-try processing, in a case where, for example, the task under re-try processing is important processing, such as a vehicle control task, for ensuring safe traveling.

Note that this processing is processing in a case where the information processing device is equipped on an automobile or the like, and the information processing device executes a task of determining a travel control mode or the like. This processing is a step unnecessary to be executed in a case where the information processing device is not equipped on an automobile or the like, or, even if the information processing device is equipped on the automobile or the like, a configuration is such that a travel control task is not executed.

(Step S204)

Next, in Step S204, the data processing unit performs a watchdog setting.

As described above, the watchdog setting means measurement start of a timer that measures whether or not a task is completed within an allowed time from task start to task completion previously defined in association with the task.

After the watchdog setting, the task is started, and in a case where the task is not completed within a task execution allowed time previously defined in association with the task, it is decided that a timeout has occurred.

(Step S205)

Next, in Step S205, the data processing unit starts lockstep processing for a task to be re-tried.

First, in Step S205, the number of processing systems that execute the lockstep processing is increased to three or more, and the same task is executed in the increased number of three or more processing systems.

Note that the lockstep processing in the re-try processing is executed under the control executed in Step S202 described above, that is to say, control of lowering the CPU operation clock and increasing voltage to be applied to the CPU circuit system (CPU, bus, or the like).

By performing these pieces of processing, it is possible to reduce an error occurrence rate.

(Step S206)

The processing in next Step S206 is also lockstep processing in the re-try processing, and processing results (calculation results) of the same task executed by using the three or more processing systems (processing systems 0, 1, . . . n) in Step S2105 are compared.

(Step S207)

Next, in Step S207, the data processing unit decides whether or not a discrepancy (error) between the processing results (calculation results) of the same task in the three or more processing systems (processing systems 0 to n) has occurred or a timeout has occurred.

In a case where it is decided that a discrepancy (error) in the processing results (calculation results) has occurred or a timeout has occurred, the processing proceeds to Step S210.

Meanwhile, in a case where it is confirmed that the processing results (calculation results) of the same task in the three or more processing systems (processing systems 0 to n) match one another without causing a timeout, the processing proceeds to Step S208.

(Step S208)

In a case where it is confirmed in Step S207 that the processing results (calculation results) of the same task in the two processing systems (processing systems 0, 1) match each other without causing a timeout, the processing proceeds to Step S208.

In Step S208, the data processing unit increments a count value of the number of times of matching of all the three or more processing systems applied to the lockstep processing of the re-try processing by one.

(Step S209)

Next, in Step S209, the data processing unit decides that normal processing has been performed, outputs the task processing results (calculation results), and moves on to processing of a next task.

Thereafter, the processing in Step S301 and subsequent steps, that is to say recovery processing from the rollback processing, is executed.

This processing will be described later.

(Step S210)

Meanwhile, in a case where it is decided in Step S207 that a discrepancy (error) in the processing results (calculation results) has occurred or a timeout has occurred, the processing proceeds to Step S210.

In Step S210, the data processing unit increments a count of the number of errors recorded corresponding to the task on which the re-try processing is executed by one, and further records time information. The time information is data for measuring time elapsed from the task start.

(Step S211)

Next, the data processing unit decides whether or not the number of errors of the tasks on which the re-try processing has been executed exceeds a previously defined threshold value.

In a case where the number of errors of the tasks on which the re-try processing has been executed exceeds the previously defined threshold value, the processing proceeds to Step S212.

Meanwhile, in a case where the number of errors of the tasks on which the re-try processing has been executed does not exceed the previously defined threshold value, the processing proceeds to Step S213.

(Step S212)

In a case where it is decided in Step S211 that the number of errors of the tasks on which the re-try processing has been executed exceeds the previously defined threshold value, the processing proceeds to Step S212.

In Step S212, the data processing unit of the information processing device moves on to an abnormality detection mode and starts abnormality detection processing.

This processing is processing of detecting an abnormal part of the system by executing a previously defined abnormality detection algorithm. Note that, at a start of this processing, processing of causing the automobile to make an emergency stop and outputting a warning to the driver, or the like is also performed.

(Step S213)

Meanwhile, in a case where it is decided in Step S21 that the number of errors of the tasks on which the re-try processing has been executed does not exceed the previously defined threshold value, the processing proceeds to Step S213.

In Step S213, in the lockstep processing to which three or more processing systems are applied, the processing being executed in Steps S205 to S206 for the task to be re-tried, the data processing unit decides whether or not results from two or more of the processing systems match each other among the task results (calculation results) from the respective processing systems.

In a case where it is decided that the results from the two or more of the processing systems match each other, the processing proceeds to Step S214.

Meanwhile, in a case where it is decided that results from two or more of the processing systems do not match each other, the processing returns to Step S204, and lockstep processing as re-try processing of the same task is executed again.

(Step S214)

In a case where it is decided in Step S213 that the results from the two or more of the processing systems match each other, the processing proceeds to Step S214.

In Step S214, the data processing unit sets and outputs the matching task processing results (calculation results) from the two or more of the processing systems as a final result of the task to which the re-try processing has been executed, and moves on to processing of a next task.

(Step S215)

Next, in Step S215, the data processing unit clears the number of errors of the task to which the re-try processing has been executed to zero.

Next, the recovery processing from the rollback processing will be described with reference to the flowchart illustrated in FIG. 7, the recovery processing being executed after the processing in Step S209 illustrated in FIG. 6.

As described above, in a case where it is confirmed in Step S208 that the processing results (calculation results) of the same task in the two processing systems (processing systems 0, 1) match each other without causing a timeout, the processing proceeds to Step S209.

In Step S209, the data processing unit decides that normal processing has been performed, outputs the task processing results (calculation results), and moves on to processing of a next task.

Thereafter, the processing in Step S301 and subsequent steps, that is to say recovery processing from the rollback processing, is executed.

The recovery processing from the rollback processing will be described with reference to the flowchart illustrated in FIG. 7.

The processing of each step of the flow illustrated in FIG. 7 will be described.

(Step S301)

First, in Step S301, the data processing unit checks reception of deceleration processing completion notification from the travel control unit.

This is processing of checking whether or not a response to a request to the travel control unit for deceleration has been received, the request being executed in Step S203 of the flow illustrated in FIG. 6.

Note that this processing is also processing in a case where the information processing device is equipped on an automobile or the like, and the information processing device executes a task of determining a travel control mode or the like. This processing is a step unnecessary to be executed in a case where the information processing device is not equipped on an automobile or the like, or, even if the information processing device is equipped on the automobile or the like, a configuration is such that a travel control task is not executed.

(Step S302)

Next, in Step S302, the data processing unit confirms priorities (Priority) and periods (Period) of all the processing systems, and updates classification of tasks subject to lockstep processing and tasks not subject to lockstep processing.

Figure 7:
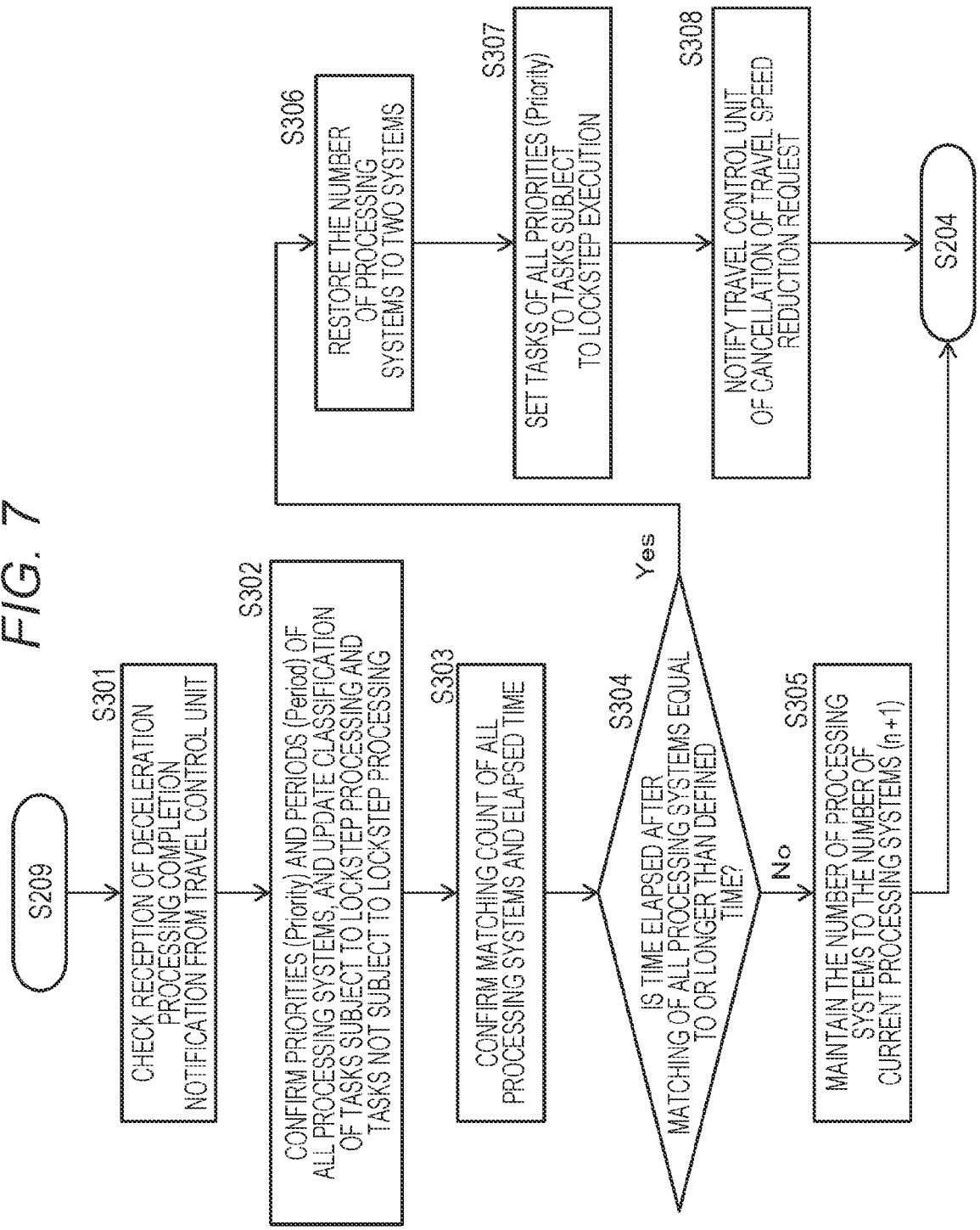
FIG. 7 is a diagram illustrating a flowchart describing the processing sequence executed by the information processing device according to the present disclosure.

This processing is processing of restoring a low-priority task that has been set as a task not subject to lockstep execution to a task subject to lockstep execution and changing to a usual setting by the following processing executed in Step S202 of the flow in FIG. 7 described above, that is to say, (d) Set a low-priority task to be excluded from lockstep execution targets.

(Step S303)

Next, in Step S303, the data processing unit acquires the count value of the number of times of matching of all the three or more processing systems applied to the lockstep processing of the re-try processing, and the time elapsed from the start of the lockstep processing of the re-try processing.

(Step S304)

Next, in Step S304, the data processing unit decides whether or not the time elapsed from the start of the lockstep processing of the re-try processing is equal to or longer than a defined time that is previously defined.

In a case where the elapsed time is equal to or longer than the defined time, the processing proceeds to Step S306.

In a case where the elapsed time is shorter than the defined time, the processing proceeds to Step S305.

(Step S305)

In a case where it is decided in Step S304 that the time elapsed from the start of the lockstep processing of the re-try processing is shorter than the defined time that is previously defined, the processing proceeds to Step S305.

In Step S305, the data processing unit maintains the number of processing systems to be applied to the lockstep processing as n+1, that is to say, n+1 of the current number of the processing systems 0 to n.

(Step S306)

Meanwhile, in a case where it is decided in Step S304 that the time elapsed from the start of the lockstep processing of the re-try processing is equal to or longer than the defined time that is previously defined, the processing proceeds to Step S306.

In Step S306, the data processing unit restores the number of processing systems applied to the lockstep processing to two. That is to say, processing of restoring to a processing coefficient at a normal time is executed.

(Step S307)

Next, in Step S307, the data processing unit executes processing of setting the tasks of all the priorities (Priority) to tasks subject to lockstep execution.

(Step S308)

Next, in Step S308, the data processing unit outputs, to the travel control unit, a notification of cancelling the travel speed reduction request.

Note that this processing is also processing in a case where the information processing device is equipped on an automobile or the like, and the information processing device executes a task of determining a travel control mode or the like. This processing is a step unnecessary to be executed in a case where the information processing device is not equipped on an automobile or the like, or, even if the information processing device is equipped on the automobile or the like, a configuration is such that a travel control task is not executed.

5. Specific Processing Example of Task Control Executed by Information Processing Device According to Present Disclosure Next, a specific processing example of task control executed by the information processing device according to the present disclosure will be described.

FIG. 8 is a diagram illustrating a table describing one example of temporal transition of a task executed by the information processing device 100.

The example illustrated in FIG. 8 is an example in which the multi-core CPU 101 has five CPUs (CPU0 to CPU4) illustrated in the left-end field of the table in FIG. 8, and each of the CPUs can execute an individual task.

FIG. 8 illustrates tasks executed by the respective CPU0 to CPU4 in times t1, t2, t3.

Task1-2: 100(RS) means lockstep processing in which Task1 is executed by two CPUs and results are compared.

Note that 2 of 2: 100 means that the same Task1 is executed by two CPUs, and 100 means that the lockstep processing execution period is 100 Hz.

Furthermore, (RS) means lockstep processing.

Task1-5: 100(RS) means lockstep processing in which Task1 is executed by five CPUs and results are compared, and that the lockstep processing execution period is 100 Hz.

Task2-1 is independent CPU processing in which Task2 is executed by one CPU, and means processing for which lockstep performing result comparison is not performed.

A lower area of the table illustrates system settings in each of processing time slots (t1 to t3).

Vehicle speed (Km/h) is speed of the vehicle equipped with the information processing device 100.

CPU clock (MHz) is a clock supplied to each of the CPUs of the multi-core CPU 101 of the information processing device 100.

CPU circuit system voltage (V) is voltage supplied to each of the CPUs of the multi-core CPU 101 of the information processing device 100, and to the CPU circuit system (CPU, bus, or the like), such as an address/data bus.

First, in time t1, a task execution state of each CPU0 to CPU5 is as follows.

CPU0=Task1-2: 100(RS)
CPU1=Task1-2: 100(RS)
CPU2=Task2-1
CPU3=idle
CPU4=idle

A state in this time t1 is a state in which lockstep processing of the same task (Task1) is being executed by using two CPUs, CPU0 and CPU1, and independent CPU processing of Task (Task2) is being executed in CPU2. CPUs 3, 4 are in an idle state in which no processing is being executed.

Task processing results (calculation results) of the same task (Task1) being executed in CPU0 and CPU1 are compared, and if the results match each other, next tasks (Task3, 4 . . . ) can be executed during time t2.

However, this example is an example in which the task processing results (calculation results) of the task (Task1) executed in CPU0 and CPU1 do not match with each other, and in this case, during time t2, the number of processing systems, that is to say the number of CPUs that execute lockstep, is increased from two to five, and the same task (Task1) is executed by using five CPUs, CPU0 to CPU4.

In time t2, a task execution state of each CPU0 to CPU5 is as follows.

CPU0=Task1-5: 100(RS)
CPU1=Task1-5: 100(RS)
CPU2=Task1-5: 100(RS)
CPU3=Task1-5: 100(RS)
CPU4=Task1-5: 100(RS)

During this time t2, the data processing unit of the information processing device 100 is executing processing of changing the system state in time t1 as illustrated in the system setting field in the lower area of FIG. 8. Specifically, system state change processing, which is reduction in vehicle speed, lowering of the CPU clock, and increasing of supply voltage to the CPU circuit system, is performed.

The reduction in vehicle speed is processing for safety measures. The lowering of the CPU clock and increasing of supply voltage to the CPU circuit system are processing for reducing possibility of error occurrence in calculation processing in the respective CPUs in time t2.

In this time t2, the same task (Task1) using the five CPUs, CPU0 to CPU4, is executed, and processing results from the respective CPUs are compared. That is to say, lockstep processing using the five CPUs is executed.

It is assumed that all the processing results match one another as a result.

In this case, next tasks are executed in next time t3.

In time t3, task execution states of the respective CPU0 to CPU5 are as follows.

CPU0=Task3-2: 100(RS)
CPU1=Task3-2: 100(RS)
CPU2=Task4
CPU3=Task5
CPU4=idle

A state in this time t3 is a state in which lockstep processing of the same task (Task3) is being executed by using two CPUs, CPU0 and CPU1, and independent CPU processing of Task (Task 4) is being executed in CPU2. CPU3 is executing independent CPU processing of Task 5 (Task 5), and CPU4 is in an idle state in which no processing is being executed.

During this time t3, the data processing unit of the information processing device 100 is executing processing of changing the system state in time t2 as illustrated in the system setting field in the lower area of FIG. 8. Specifically, system state change processing, which is increasing of vehicle speed, increasing of the CPU clock, and lowering of supply voltage to the CPU circuit system, is performed.

That is to say, in time t3, processing of restoring the system state to a usual state (normal state) is performed, and then the task is executed.

6. Conclusion and Effects of Processing by Information Processing Device According to Present Disclosure Next, conclusion and effects of processing by the information processing device according to the present disclosure will be described.

As described above, the information processing device according to the present disclosure performs processing by changing an execution mode for lockstep processing according to a task. That is to say, for each of various tasks executed by the information processing device 100 according to the present disclosure, the information processing device 100 previously set the following parameters, (1) Lockstep processing execution priority (Priority)
(2) Lockstep processing execution period (period (Period))

and executes lockstep processing for each of the tasks according to the parameters.

Note that the information processing device 100 according to the present disclosure further dynamically changes whether or not to execute lockstep according to the lockstep processing execution priority (Priority).

Specifically, for example, the following control is performed.

(a) In a case where the lockstep processing execution period (period (Period)) of a task under execution in the information processing device 100 is long, the CPU has a margin in calculation capability and therefore, lockstep for all calculations are performed, including a task having a low lockstep processing execution priority (Priority).

(b) In a case where the lockstep processing execution period (period (Period)) of the task under execution becomes short in the information processing device 100, and the calculation load increases to such an extent that the processing according to a lockstep processing execution period (period (Period)) defined in the task cannot be performed, lockstep of a task with a low lockstep processing execution priority (Priority) is set as not to be executed.

However, in a case where the CPU obtains a margin in calculation capability, the task having low lockstep processing execution priority (Priority) is also reset to a lockstep execution target task again.

With these pieces of processing, it is possible to perform a lockstep according to required processing or period while providing an upper limit to overall CPU calculation processing.

Note that the information processing device 100 according to the present disclosure further performs the following control when executing lockstep processing.

In a case where the task subject to lockstep processing includes a calculation step using a random number, result comparison that allows an error at a time of the result comparison is performed. Alternatively, the task subject to lockstep processing is temporarily excluded from targets of comparison of calculation results.

In a case where the task subject to lockstep processing includes a calculation step using a random number, a value of the random number utilized in each of the CPUs may be different from one another even if the same task is executed in each of the CPUs. In such a case, even if task results (calculation results) from the respective CPUs are compared, the task results do not match one another.

In preparation for such a case, the information processing device 100 according to the present disclosure decides whether or not the task subject to the lockstep processing includes a calculation step using a random number, and in a case where the task includes the calculation step, performs result comparison that allows an error at a time of the result comparison. Alternatively, the task subject to lockstep processing is temporarily excluded from targets of comparison of calculation results. For example, processing of temporarily turning off (OFF) a result comparison function is performed. With this arrangement, for example, application to an application such as simulation is also possible.

Next, effects of processing by the information processing device according to the present disclosure will be described.

For example, the following effects can be obtained by lockstep control processing by the information processing device 100 according to the present disclosure.
  (1) A calculation error rate can be further reduced as compared to conventional lockstep processing.
  (2) It is possible to further improve an error detection rate that is 1/1 billion hours as required in an in-vehicle field (ISO26262 ASIL-D), which is very difficult to achieve.
  (3) Optimal lockstep processing according to a degree of importance of processing can be executed in an environment with limiting conditions (calculation processing capability) such as a system incorporated in a vehicle.
  (4) Because a plurality of calculation results is collectively compared, overhead of the comparison can be reduced.
  (5) Because lockstep processing is executed as result comparison processing not by a comparison circuit using hardware but by software, it is easy to dynamically change a size of units of processing.
  (6) Because of result comparison by software, there is no hardware restriction on increasing speed of a CPU clock, and there is no impact on a circuit scale.
  (7) It is possible to prioritize high-speed processing by not performing lockstep for a task less important in reliability.
  (8) In result comparison processing in lockstep processing, not only the exact matching of results, but also processing in which an error is allowed can be performed to handle a task including calculation utilizing a random number or the like.

7. Configuration Example of Information Processing Device

Next, a hardware configuration example of an information processing device that executes processing according to the above-described embodiment will be described with reference to FIG. 9.

Figure 9:
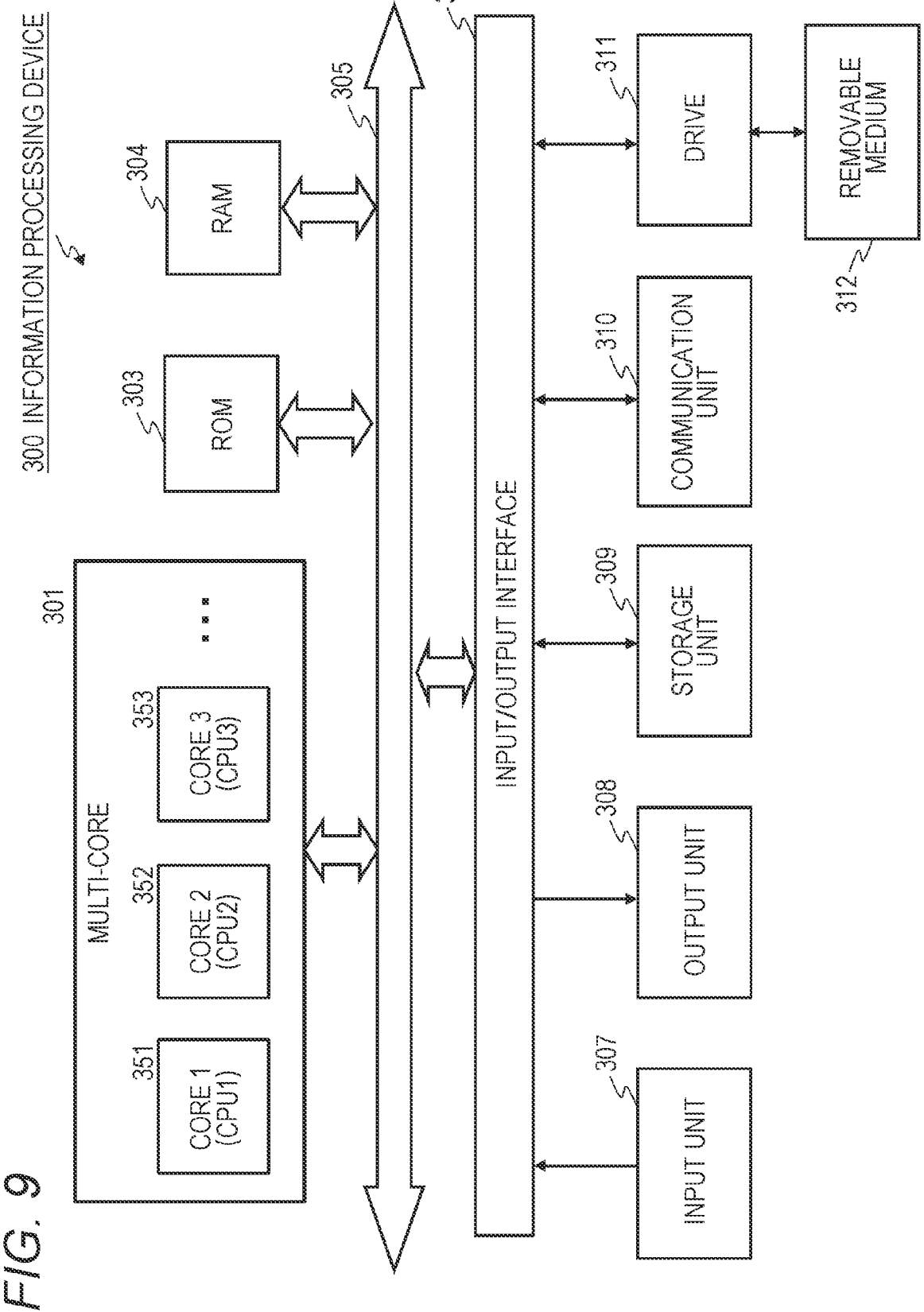
FIG. 9 is a diagram describing a hardware configuration example of the information processing device.

Hereinafter, an information processing device 300 illustrated in FIG. 9 is an information processing device illustrating one example of an overall configuration of the information processing device 100 illustrated in FIG. 1 and described in the above-described embodiment. Each component constituting the information processing device 300 will be described.

A multi-core 301 includes a plurality of cores (central processing units (CPUs)). As illustrated in FIG. 11, the multi-core 301 has at least two or more cores such as a core 1 (CPU1) 351, a core 2 (CPU2) 352, and a core 3 (CPU3) 353.

In the plurality of cores (CPUs), for example, various kinds of processing according to a program stored in a read only memory (ROM) 303 or a storage unit 309 is executed.

The read only memory (ROM) 303 is utilized as a storage area for a program executed by the multi-core 301 or a GPU 302, a parameter, or the like.

The random access memory (RAM) 304 is utilized as a work area for processing executed by the multi-core 301 or the GPU 302, a parameter storage area, a recording area of other data, or the like.

The multi-core 301, the GPU 302, the ROM 303, and the RAM 304 are mutually connected by a bus 305.

The multi-core 301, the GPU 302, and the like are connected to an input/output interface 306 via the bus 305, and the input/output interface 306 is connected to an input unit 307 including various kinds of switches, a keyboard, a touch panel, a mouse, a microphone, a data acquisition unit such as a sensor or a camera, or the like, and an output unit 309 including a display such as a monitor, a speaker, or the like.

The multi-core 301 inputs a command, situation data, or the like input from the input unit 307, executes various kinds of processing, and outputs a processing result to, for example, an output unit 308.

The storage unit 309 connected to the input/output interface 306 includes, for example, a hard disk or the like, and stores a program executed by the multi-core 301 or various kinds of data. A communication unit 310 functions as a transmission/reception unit for data communication via a network such as the Internet or a local area network, and communicates with an external device.

A drive 311 connected to the input/output interface 306 drives a removable medium 312 such as a magnetic disk, an optical disc, a magneto-optical disk, or a semiconductor memory such as a memory card, and records or reads data.

8. Conclusion of Configuration of Present Disclosure

Hereinabove, the embodiment according to the present disclosure have been described in detail with reference to the specific embodiment. However, it is obvious that those skilled in the art may make modifications or substitutions to the embodiment without departing from the scope of the present disclosure. That is to say, the present invention has been disclosed in a form of exemplification, and should not be interpreted to be limited. In order to determine the scope of the present disclosure, the claims should be taken into consideration.

Note that the technology disclosed in the present specification can be used for the present technology.

(1)

An information processing device including a data processing unit that executes lockstep processing in which a plurality of processing systems executes the same task and error verification is performed by comparing execution results,
  in which, in a case where an error is detected in the lockstep processing, the data processing unit executes control for improving noise tolerance of a CPU circuit system that executes the task, and then re-executes the task.

(2)
The information processing device according to (1),
  in which the data processing unit increases supply voltage to the CPU circuit system as control for improving noise tolerance of the CPU circuit system.

(3)
The information processing device according to (1) or (2),
  in which the data processing unit lowers a supply clock to the CPU circuit system as control for improving noise tolerance of the CPU circuit system.

(4)
The information processing device according to any one of (1) to (3),
  in which the data processing unit performs re-execution processing of the task by using more processing systems than the processing systems before the error detection.

(5)
The information processing device according to (4),
  in which, after performing re-execution processing of the task by using more processing systems than the processing systems before the error detection, the data processing unit performs processing of reducing the number of the processing systems on condition of a reduction in occurrence of an error.

(6)
The information processing device according to any one of (1) to (5),
  in which the data processing unit has a configuration in which processing according to lockstep processing execution priority that is set to each task is executed, and
  lockstep processing is executed by placing priority on a task with high lockstep processing execution priority.

(7)
The information processing device according to (6),
  in which the data processing unit does not execute lockstep processing on a task with low lockstep processing execution priority.

(8)
The information processing device according to any one of (1) to (7),
  in which the data processing unit executes lockstep processing of each task according to lockstep processing execution period that is set to each task.

(9)
The information processing device according to any one of (1) to (8),
  in which the data processing unit dynamically changes the number of processing systems that execute lockstep processing.

(10)
The information processing device according to any one of (1) to (9), the information processing device being mounted on a mobile device,
  in which, in a case where an error has been detected in the lockstep processing, the data processing unit reduces travel speed of the mobile device, and then re-executes the task.

(11)
The information processing device according to (10),
  in which, after re-executing the task, the data processing unit performs processing of increasing travel speed of the mobile device on condition of a reduction in occurrence of an error.

(12)
An information processing method executed in an information processing device,
  in which the information processing device has a data processing unit that executes lockstep processing in which a plurality of processing systems executes the same task and error verification is performed by comparing execution results, and
  in a case where an error is detected in the lockstep processing, the data processing unit executes control for improving noise tolerance of a CPU circuit system that executes the task, and then re-executes the task.

(13)
A program that causes execution of information processing in an information processing device,
  in which the information processing device has a data processing unit that executes lockstep processing in which a plurality of processing systems executes the same task and error verification is performed by comparing execution results, and
  in a case where an error is detected in the lockstep processing, the program causes the data processing unit to execute control for improving noise tolerance of a CPU circuit system that executes the task, and then re-execute the task.

The series of processing described in the specification can be executed by hardware, software, or a combined configuration of both. In a case where processing is executed by software, it is possible to install a program in which a processing sequence is recorded, on a memory in a computer incorporated in dedicated hardware and execute the program, or it is possible to install and execute the program on a general-purpose personal computer that is capable of executing various kinds of processing. For example, the program can be previously recorded on a recording medium. In addition to installation from the recording medium to the computer, the program can be received via a network such as a local area network (LAN) or the Internet and installed on a recording medium such as a built-in hard disk.

Note that the various kinds of processing described in the specification may be executed not only in time series according to the description but also in parallel or individually, according to processing capability of a device that executes the processing, or as necessary. Furthermore, in the present specification, a system is a logical set configuration of a plurality of devices, and is not limited to a system in which devices of respective configurations are in the same housing.

INDUSTRIAL APPLICABILITY

As described above, according to a configuration of an embodiment of the present disclosure, an information processing device and information processing method with improved error tolerance are implemented.

Specifically, for example, a configuration of an embodiment of the present disclosure has a data processing unit that executes lockstep processing in which a plurality of processing systems executes the same task and error verification is performed by comparing execution results. In a case where an error is detected in the lockstep processing, the data processing unit increases supply voltage to a CPU circuit system that executes the task, processing of lowering a supply clock, or the like, as control for improving noise tolerance of the CPU circuit system, and moreover, performs re-execution processing of the task by using more processing systems than the processing systems before the error detection.

With this configuration, an information processing device and information processing method with improved error tolerance are implemented.

REFERENCE SIGNS LIST

100 Information processing device
101 Multi-core CPU
102 RAM
103 ROM
104 Large-capacity non-volatile storage device
105 Bus
200 Mobile device
201 Camera
202 AV equipment
211 Vehicle drive unit
212 GPS receiver
213 Communication unit
214 Input/output IF
220 GPS satellite
300 Information processing device
301 Multi-core
303 ROM
304 RAM
305 Bus
306 Input/output interface
307 Input unit
308 Output unit
309 Storage unit
310 Communication unit
311 Drive
312 Removable medium
351 to 353 Core (CPU)

The invention claimed is:

1. An information processing device, comprising:
a data processing unit configured to:
execute lockstep processing in which each of a plurality of processing systems executes a task;
execute error verification by comparing execution results of the task; and
in a case where an error is detected in the lockstep processing:
execute control for improving noise tolerance of a CPU circuit system that executes the task,
wherein a supply clock to the CPU circuit system is lowered as the control for improving the noise tolerance; and
re-execute the task.

2. The information processing device according to claim 1,
wherein the data processing unit is further configured to increase supply voltage to the CPU circuit system as control for improving the noise tolerance of the CPU circuit system.

3. The information processing device according to claim 1,
wherein the data processing unit is further configured to perform re-execution processing of the task by using more processing systems than the plurality of processing systems before the error detection.

4. The information processing device according to claim 3,
wherein, after performing the re-execution processing of the task by using more processing systems than the plurality of processing systems before the error detection, the data processing unit is further configured to perform processing of reducing a number of the processing systems on condition of a reduction in occurrence of an error.

5. The information processing device according to claim 1,
wherein the data processing unit is further configured to process according to lockstep processing execution priority that is set to each task is executed, and
the lockstep processing is executed by placing priority on a task with high lockstep processing execution priority.

6. The information processing device according to claim 5,
wherein the data processing unit does not execute the lockstep processing on a task with low lockstep processing execution priority.

7. The information processing device according to claim 1,
wherein the data processing unit is further configured to execute the lockstep processing of each task according to a lockstep processing execution period that is set to each task.

8. The information processing device according to claim 1,
wherein the data processing unit is further configured to dynamically change a number of processing systems that execute the lockstep processing.

9. The information processing device according to claim 1, the information processing device being mounted on a mobile device,
wherein, in a case where an error has been detected in the lockstep processing, the data processing unit is further configured to reduce a travel speed of the mobile device, and then re-executes the task.

10. The information processing device according to claim 9,
wherein, after re-executing the task, the data processing unit is further configured to perform processing of increasing the travel speed of the mobile device on condition of a reduction in occurrence of an error.

11. An information processing method executed in an information processing device, wherein the information processing device has a data processing unit, comprising:
executing lockstep processing in which each of a plurality of processing systems executes a task;
executing error verification by comparing execution results of the task; and
in a case where an error is detected in the lockstep processing:
executing control for improving noise tolerance of a CPU circuit system that executes the task,
wherein a supply clock to the CPU circuit system is lowered as the control for improving the noise tolerance; and
re-executing the task.

12. A non-transitory computer-readable medium having stored thereon computer-executable instructions which, when executed by a computer, cause the computer to execute operations, the operations comprising:
executing lockstep processing in which each of a plurality of processing systems executes a task;

executing error verification by comparing execution results of the task; and in a case where an error is detected in the lockstep processing:

executing control for improving noise tolerance of a CPU circuit system that executes the task,
wherein a supply clock to the CPU circuit system is lowered as the control for improving the noise tolerance; and re-executing the task.

\* \* \* \* \*